United States Patent
Jones et al.

(10) Patent No.: US 10,467,443 B2
(45) Date of Patent: Nov. 5, 2019

(54) RFID ERROR DETECTION SYSTEMS AND METHODS

(71) Applicant: Walmart Apollo, LLC, Bentonville, AR (US)

(72) Inventors: Nicholaus A. Jones, Fayetteville, AR (US); Matthew A. Jones, Bentonville, AR (US); Aaron J. Vasgaard, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/397,889

(22) Filed: Apr. 29, 2019

(65) Prior Publication Data
US 2019/0258834 A1     Aug. 22, 2019

Related U.S. Application Data

(63) Continuation of application No. 15/983,520, filed on May 18, 2018, now Pat. No. 10,318,770.

(60) Provisional application No. 62/508,531, filed on May 19, 2017.

(51) Int. Cl.
*G06K 7/10* (2006.01)
*G06Q 20/20* (2012.01)
*G07G 1/00* (2006.01)

(52) U.S. Cl.
CPC ..... *G06K 7/10356* (2013.01); *G06K 7/10108* (2013.01); *G06Q 20/208* (2013.01); *G07G 1/009* (2013.01)

(58) Field of Classification Search
CPC .............. G06K 7/10356; G06K 7/10108
USPC ................................. 340/10.1–10.5
See application file for complete search history.

(56) References Cited

U.S. PATENT DOCUMENTS

| | | | |
|---|---|---|---|
| 4,964,053 A | 10/1990 | Humble | |
| 5,530,702 A | 6/1996 | Palmer | |
| 6,693,539 B2 | 2/2004 | Bowers | |
| 7,501,950 B2 | 3/2009 | Suzuki | |
| 7,575,162 B1 | 8/2009 | Malchak | |

(Continued)

OTHER PUBLICATIONS

Oosemdiscovery; "Future Store Smart Check Out—RFID"; https://www.youtube.com/watch? v=xFNGiTGyQzk; Published on Sep. 24, 2013; pp. 1-6.

(Continued)

*Primary Examiner* — Allen T Cao
(74) *Attorney, Agent, or Firm* — Fitch, Even, Tabin & Flannery LLP (57) ABSTRACT

In some embodiments, systems and methods are provided herein to improve RFID tag reading. Some embodiments provide retail RFID tag exclusion systems that comprise: a set of RFID tag readers; and an RFID evaluation control circuit configured to: access a set of current tag read criteria associated with an RFID tag; access multiple sets of previous tag read criteria; access and apply a set of tag evaluation rules and identify when a threshold number of the set of current tag read criteria are each within corresponding criteria thresholds of a corresponding previous tag read criterion of a previous set of tag read criteria; and exclude the RFID tag when the threshold number of the current tag read criteria are within the corresponding criteria thresholds of the corresponding previous tag read criterion of the set of previous tag read criteria.

20 Claims, 4 Drawing Sheets (56) References Cited

U.S. PATENT DOCUMENTS

| | | | |
|---|---|---|---|
| 7,997,486 | B2 | 8/2011 | Ulrich |
| 1,031,877 | A1 | 6/2019 | Jones |
| 2004/0220860 | A1 | 11/2004 | Persky |
| 2014/0159869 | A1 | 6/2014 | Zumsteg |
| 2014/0167920 | A1 | 6/2014 | Kamiya |
| 2014/0214577 | A1 | 7/2014 | Acker, Jr. |
| 2016/0253885 | A1 | 9/2016 | Nassar |
| 2018/0336380 | A1* | 11/2018 | Jones ............... G06K 7/10356 |
| 2018/0350218 | A1* | 12/2018 | Jeon ................ G06K 7/10475 |

OTHER PUBLICATIONS

PCT; App. No. PCT/US2018/033079; International Search Report and Written Opinion dated Aug. 3, 2018.
USPTO; U.S. Appl. No. 15/983,520; Notice of Allowance dated Jan. 30, 2019.

\* cited by examiner

*FIG. 5*

RFID ERROR DETECTION SYSTEMS AND METHODS

CROSS-REFERENCE TO RELATED APPLICATION

This application is a continuation of U.S. application Ser. No. 15/983,520, filed May 18, 2018, which claims the benefit of U.S. Provisional Application No. 62/508,531, filed May 19, 2017, each of which is incorporated herein by reference in its entirety.

TECHNICAL FIELD

This invention relates generally to reading RFID tags.

BACKGROUND

Retail shopping facilities often have thousands of different items that can be purchased. In some instances, one or more of these items are uniquely identified through a bar code, radio frequency identifier (RFID) tag, or other identifier. When RFID tags are used, the retail facility uses RFID tag readers to detect and read the RFID tags. Often these RFID tag readers are positioned a distance from the tags when read. There is a need for improvements in RFID tag usage.

BRIEF DESCRIPTION OF THE DRAWINGS

Disclosed herein are embodiments of systems, apparatuses and methods pertaining to detecting erroneous radio frequency identification (RFID) tag reads. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful in detecting erroneous radio frequency identification (RFID) tag reads. In some embodiments, RFID tag exclusion systems identify erroneous RFID tags that, for example, may incorrectly be associated with a customer, and exclude that erroneous RFID tag and/or the corresponding item from being associated with a customer or other association. The RFID tag exclusion system, in some applications, includes a set of at least one RFID antennas positioned proximate a limited area within a retail shopping facility and which are configured to detect RFID tags at least within the limited area. An RFID criteria database can receive and store sets of RFID tag read criteria over time associated with different RFID tags. An RFID evaluation control circuit executing code stored on memory is configured to: access a first set of current tag read criteria associated with a current reading of a first RFID tag by the set of at least one RFID antennas; access, through the criteria database, multiple sets of previous tag read criteria; access a set of at least one tag evaluation rules to evaluate detected RFID tags; apply the set of tag evaluation rules and identify when a threshold number of the first set of current tag read criteria are each within corresponding criteria thresholds of a corresponding previous tag read criterion of a second set of previous tag read criteria; and exclude the first RFID tag when the threshold number of the first set of current tag read criteria are within the corresponding criteria thresholds of the corresponding previous tag read criterion of the second set of previous tag read criteria.

Figure 1:
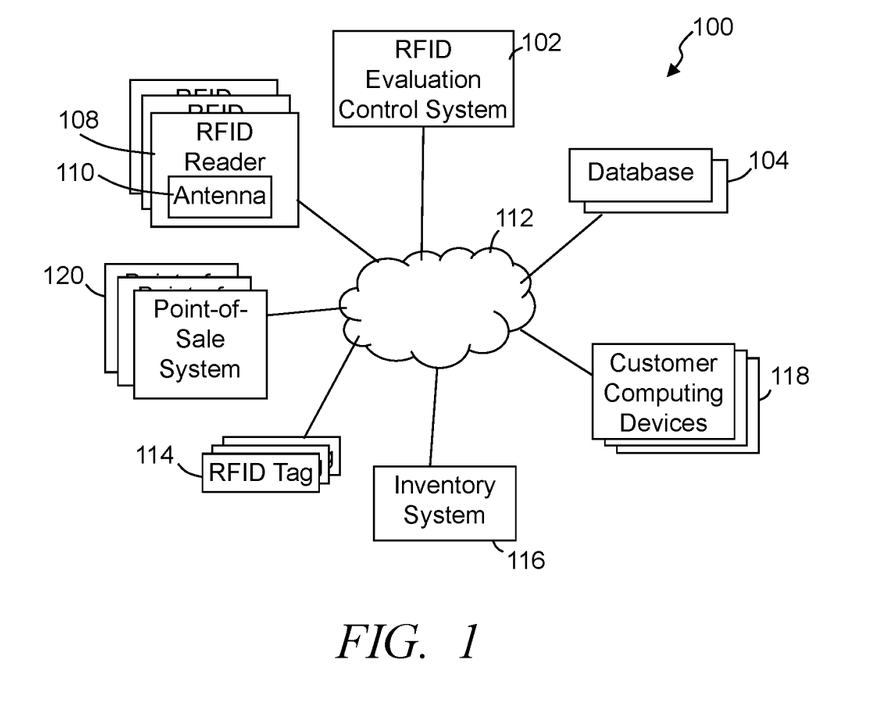
FIG. 1 illustrates a simplified block diagram of an exemplary retail radio frequency identifier (RFID) tag exclusion system, in accordance with some embodiments.
Figure 2:
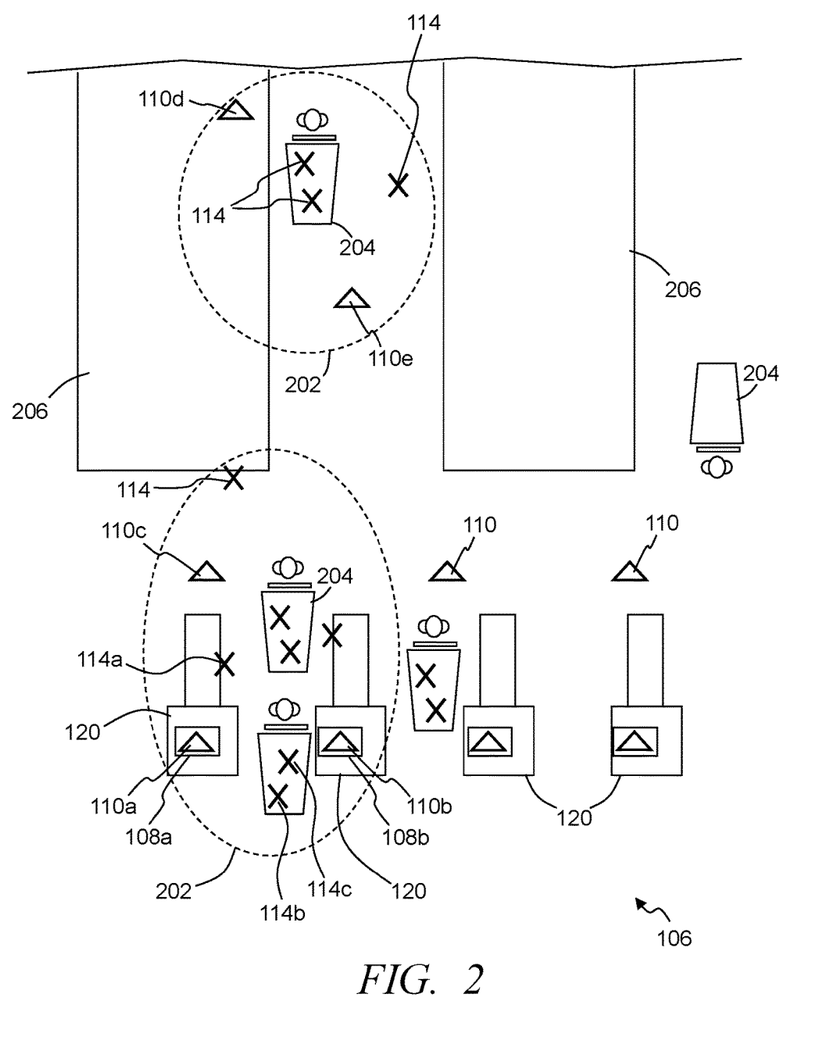
FIG. 2 illustrates a simplified block diagram overhead view of an exemplary retail shopping facility, in accordance with some embodiments.

FIG. 1 illustrates a simplified block diagram of an exemplary retail radio frequency identifier (RFID) tag exclusion system 100, in accordance with some embodiments. The RFID tag exclusion system at least in part identifies and excludes erroneous RFID tags and/or corresponding items at one or more retail shopping facilities. FIG. 2 illustrates a simplified block diagram overhead view of an exemplary retail shopping facility 106, in accordance with some embodiments. Referring to FIGS. 1-2, in some embodiments, the RFID tag exclusion system 100 includes one or more RFID evaluation control systems 102 communicatively coupled, over one or more distributed communication and/or computer networks 112, with one or more databases, including databases such as an RFID criteria database 104, inventory database and other such databases. Further, the RFID evaluation control system 102 is communicatively coupled via the distributed computer network 112 with RFID tag readers 108 each having a set of one or more RFID antennas 110. Typically, multiple RFID tag readers 108 and/or RFID antennas 110 are distributed throughout one or more areas of a retail shopping facility. Numerous RFID tags 114 are distributed throughout one or more areas of the shopping facility, and may be cooperated with items being sold through the shopping facility, carts 204, baskets, shelve units 206, display cases, modulars, racks, other such objects, and typically multiple of such objects.

One or more point-of-sale (POS) systems 120 are included in the retail shopping facility and may be directly or indirectly communicatively coupled with the RFID evaluation control system 102, such as over the distributed network 112. The RFID evaluation control system may be located at the shopping facility, or may be partially or fully implemented remote from the shopping facility. Further, in some embodiments, the RFID evaluation control system may evaluate RFID tags at multiple different shopping facilities. In some embodiments, the RFID evaluation control system 102 may be implemented through multiple different components at the shopping facility and/or remote from the shopping facility. In some applications, some or all of the RFID evaluation control system may be implemented, for example, in the RFID tag readers 108, one or more point of sale systems 120, and/or other systems. Accordingly, some or all of the processing and evaluation of RFID tag criteria may be performed at the RFID readers, which may maintain at least a portion of an RFID criteria database 104 or different portions of the RFID tag criteria database may be duplicated at different RFID readers. Additionally, in some instances, the RFID reader may periodically purge portions of the RFID tag read criteria over time, such as RFID tag read criteria having been stored for a threshold period of time and/or a similar set of RFID tag read criteria not having been detected for a threshold period of time from that RFID tag reader and/or another RFID tag reader. Some embodiments implement the RFID tag read criteria evaluation remote from the shopping facility through one or more remote and/or central RFID evaluation control systems 102. This remote processing can allow for improved implementation through simplified updating of hardware systems of the one or more central RFID evaluation control system, and similarly enables greater storage capabilities at reduced cost through one or more remote and/or central storage systems maintaining the RFID criteria database 104 and/or other databases. Still further, the distributed processing and/or data storage, whether at the shopping facility (e.g., through RFID tag readers, and/or one or more local RFID evaluation control systems 102) and/or remote from the shopping facility, allows for greater availability of processing capabilities, and further provides for redundancy and failure protection in the event of a failure and/or loss of communication connection from one or more of the processing systems and/or data storage.

In some embodiments, the RFID tag exclusion system 100 may further communicate with multiple different customer computing devices 118 carried by customers while at the shopping facility, and in some instances may communicate with customer computing devices that are remote from the shopping facility. In some embodiments, the RFID tag exclusion system includes one or more inventory systems 116 that track inventory of products at one or more shopping facilities.

In some implementations, a set of at least one RFID antennas 110a-c and/or RFID tag readers 108 are positioned proximate a limited area 202 within a retail shopping facility to detect RFID tags within at least the area 202. The limited area may be part of or proximate one or more point-of-sale systems 120, may be a "RFID tunnel", may be proximate an exit of a shopping facility, may be limited by read range of one or more specific RFID tag readers 108 and/or antennas 110, or other such limited area. In detecting the RFID tags, the RFID tag readers and/or antennas acquire and/or determine a set of one or more RFID tag read criteria associated with each of multiple RFID tags detected. The tag read criteria can include one or more of but is not limited to: received signal strength indicator (RSSI), angle of signal arrival, phase of modulation, read rate, identification of an antenna 110 that detected a tag, one or more identifiers within the RFID read, and other such criteria. Sets of one or more RFID tag read criteria associated with each detected and/or read RFID tag 114 can be saved, such as within an RFID tag reader 108, the RFID criteria database 104, other database, other memory of one or more other devices, or combination of multiple locations and devices. In some implementations, the RFID criteria database receives and stores sets of RFID tag read criteria from multiple different RFID tag readers 108 and/or antennas 110 for multiple different RFID tags 114.

The RFID evaluation control system stores and/or accesses computer program modules of code that are executed by the evaluation control system to access sets of current tag read criteria associated with read RFID tags. Again, the set of tag read criteria may be accessed through the RFID criteria database 104 and/or one or more RFID tag readers or antennas. In evaluating RFID tags, the RFID evaluation control system typically utilizes a current or more recent set of RFID tag criteria associated with an RFID tag (e.g., RFID tag 114a) being evaluated. For example, the RFID evaluation control system can access a set of current tag read criteria associated with a most recent and current reading of a first RFID tag 114a that is detected and/or read by one or more of the set of at least one RFID tag readers 108 and/or antennas 110a-c that are within a threshold reading range of the first RFID tag 114a being evaluated. Further, the RFID evaluation control system can access, through the RFID criteria database 104, multiple sets of previous tag read criteria associated with the first RFID tag 114a and/or other RFID tags.

The RFID evaluation control system 102 evaluates the current set of RFID tag read criteria relative to one or more previous sets of detected RFID tag read criteria. In some embodiments, the RFID tag evaluation system accesses a set of at least one tag evaluation rules to evaluate detected RFID tags, and applies one or more the set of tag evaluation rules to identify when a threshold number of a set of current tag read criteria associated with the first RFID tag are each within corresponding criteria thresholds of a corresponding previous tag read criterion of a set of previous tag read criteria associated with an RFID tag. The evaluation rules at least direct the evaluation of the multiple different tag read criteria, can specify priorities of tag read criteria, can specify criteria thresholds, can specify threshold numbers of criteria, and the like. For example, the tag evaluation rules may specify different criteria thresholds for different combinations of tag read criteria, different priorities of tag read criteria depending on detected tag read criteria, timing of when to consider tag read criteria, levels of tag read criteria indicating that a tag read criteria is insufficient to accurately be relied upon, and other such rules. As a non-limiting example, in some applications the RSSI may be specified as having a highest priority, with an angle of arrival having a secondary priority. The priorities may allow for greater variation of other RFID tag read criteria when the one or more higher priority RFID tag read criteria are the same or within a threshold variation from a previous read. Some embodiments include one or more rules maintained by the RFID evaluation control system. Additionally or alternatively, one or more rules databases may be maintained local to the retail facility and/or remote from the retail facility that stores at least some of the tag evaluation rules applied by the RFID evaluation control system. This evaluation between multiple sets of tag read criteria is different than other RFID tag systems in part because the RFID evaluation control system considers the RFID tag criteria instead of simply detecting a tag identifier associated with an RFID tag. The mere detection of a tag identifier in other RFID tag processing may result in inadvertently disregarding an RFID tag when the tag should be considered (e.g., the RFID tag was previously not part of a customer's products, but has since been retrieved by a different customer and should be considered as part of the products associated with that customer). Further, the comparison of multiple tag read criteria provides a more accurate identification of an RFID tag relative to whether that RFID tag has been moved, which again enables a more accurate consideration of RFID tags and/or whether to disregard an RFID tag or exclude the tag from being associated with a customer or other grouping.

Based on the evaluation of the set of current tag read criteria relative to one or more previous sets of tag read criteria, the RFID tag evaluation control system 102 can identify a RFID tag that has a threshold number of the set of current tag read criteria that are within corresponding criteria thresholds of a corresponding previous tag read criterion of a set of previous tag read criteria. When the threshold number of the set of current tag read criteria are within the corresponding criteria thresholds of the corresponding previous tag read criterion of the set of previous tag read criteria, the RFID evaluation control system can exclude that RFID tag and/or the corresponding item from an association with a customer, association of items being moved through and/or stocked in an area 202, or other association of an RFID tag being erroneously associated. As one example, a point-of-sale system 120 (e.g., through one or more RFID tag readers 108a) and/or other RFID tag readers can detect products that the point-of-sale system determines are being purchased by a customer during a check-out process of purchasing items from the shopping facility 106. In some instances, an erroneous RFID tag (e.g., RFID tag 114a) may be detected by the point-of-sale RFID tag reader 108a and/or one or more other RFID tag readers and erroneously determined to be part of the one or more products attempting to be purchased by the customer. By evaluating the current RFID tag criteria corresponding to the multiple RFID tags read relative to previous tag read criteria, the RFID evaluation control system can identify the erroneous RFID tag that was erroneously associated with the customer's products being purchased.

Further, the RFID evaluation control system does not limit the evaluation to the RFID tag identifier detected, but instead evaluates a set of one or more RFID tag read criteria to improve an accuracy of identifying an RFID tag that should not be included in the association with the customer or other association, and further reduces a likelihood that a customer is not charged for an item that the customer actually has picked up and is purchasing when that item was previously identified as potentially erroneous. The limited use of only the identifier from the RFID tag would potentially allow an RFID tag that was previously identified as potentially erroneous to be excluded from an association with the customer (or other association) when in fact the item should be associated with the customer. By using one or more of the multiple tag read criteria, the RFID evaluation control system can confirm that the identified RFID tag has been moved from a previous location, and thus more likely should be included in the association with a customer and/or one or more other items (e.g., the items should be part of the items the customer intends to purchase). Further, in some implementations, the RFID evaluation control system excludes the identifier associated with the RFID as a criterion considered such that a set of current tag read criteria does not include an identifier of the RFID tag.

As one non-limiting example, an RFID tag may be detected by each of two different RFID tag antennas 110b, 110c and/or RFID tag readers. For each of the antennas and/or RFID tag readers, a set of current RFID tag read criteria is acquired (e.g., one or more of RSSI, angle of signal arrival, phase of modulation, read rate, identification of the detecting antenna 110, an RFID tag identifiers, etc.). One or more of the tag read criteria can be evaluated relative to previous tag read criteria to determine whether one or more of the current tag read criteria is consistent with at least one previously detected corresponding tag read criteria (e.g., difference between current RSSI and one or more previous RSSIs; difference between current angle of arrival and one or more previous angles of arrival; etc.). Again, in some instances, the RFID evaluation control system applies one or more of a set of tag evaluation rules to identify whether a threshold number of the set of the current tag read criteria are within corresponding criteria thresholds of a corresponding previous tag read criterion of a set of previous tag read criteria, which are usually maintained in the criteria database. In some embodiments, the RFID evaluation control system in executing code stored in memory identifies when a threshold number of a set of previous tag read criteria have each been within corresponding criteria thresholds of a threshold number of other sets of tag read criteria. The set of previous tag read criteria can be designated as an erroneous set of tag reads to be used to exclude subsequently detected sets of tag read criteria that have the threshold number of tag read criteria that each are within the corresponding criteria thresholds of the third set of previous tag reads.

The threshold number of tag read criteria typically depends on the current and/or previous tag read criteria available, an assumed or determined accuracy of one or more tag read criteria, a number of RFID tags being detected and associated, determined levels of interference, other such factors, and typically a combination of such factors. For example, some embodiments may allow greater threshold variations between current and previous tag read criteria when a larger number of tag read criterion are being evaluated, while a reduced threshold variation between a current and previous tag read criterion may be acceptable when one or a couple of tag read criteria are considered.

Based on the evaluation between current tag read criteria and one or more sets of previous tag read criteria, the RFID evaluation control system can exclude one or more RFID tags from being associated with a customer, other RFID tags, other products, or other such associations. In some instances, for example, an RFID tag is excluded from an association with a customer when the threshold number of the set of current tag read criteria are within the corresponding criteria thresholds of the corresponding previous tag read criterion of a set of previous tag read criteria. This exclusion can exclude the item exclusively associated with the erroneous RFID tag from being included in products being purchased by a customer such that the customer is not charged for that item.

In some instances, an item exclusively associated with a particular RFID tag may be identified by a customer as being erroneously included in a listing of products associated with the customer, such as a listing of products a point-of-sale system 120 identifies as being purchased by the customer. The RFID evaluation control system 102 can be configured to identify a set of items associated with a person. Again, this listing may be provided by a point-of-sale system, an RFID tag reader cooperated with a shopping cart, RFID tags read by a customer's personal customer computing device 118 (e.g., smart phone, tablet, etc.), compiled by the RFID evaluation control system, and/or other such devices. As one example, one or more RFID tag readers 108 associated with and/or in communication with a point-of-sale system 120 may detect a set of RFID tags 114a-c that the point-of-sale system determines corresponds to a set of one or more items a person at the retail shopping facility is attempting to purchase. The point-of-sale system 120 can generate a listing of those items. In some embodiments, the listing of the set of items is caused to be presented to the person. For example, point-of-sale system can display the listing of items, the RFID evaluation control system 102 can direct the point-of-sale system to render the listing, and the like. Further, the listing of one or more items may be presented to the customer through a graphical user interface displayed on a display associated with the point-of-sale system, on a customer computing device 118 associated with the customer (e.g., a smart phone, a tablet, a store supplied RFID and/or bar code scanning device, etc.), and/or other such device. In some instances, the listing is displayed through a user interface that a person can interact with to provide feedback to the RFID evaluation control system and/or point-of-sale system. As another example, a set of one or more RFID tag readers 108 may detect a set of one or more RFID tags each uniquely associated with a particular one of a set of one or more items that a shopping facility worker is going to stock onto shelves of the shopping facility. The RFID evaluation control system can communicate the listing to a computing device carried by the shopping facility worker to be displayed to the worker.

Further, in some embodiments the RFID evaluation control circuit can receive a notification specified by the person viewing the listing that at least one item from the listing should not be included in the listing. In furthering the example above, a customer may be presented with a listing of items the point-of-sale system presented to a customer of items for which the point-of-sale system intends to charge the customer. Upon review of the listing, the customer may identify that one of the items is incorrectly included in the listing (e.g., an item uniquely associated with a first RFID tag 114a). Again, the one or more RFID tag readers may inadvertently detect an RFID tag 114a that should not to be associated with a person (or other association). The RFID evaluation control system further causes the corresponding set of tag read criteria associated with the incorrectly listed item to be added to the RFID criteria database 104. Accordingly, subsequent detections of the first RFID tag 114a can be evaluated by comparing the tag read criteria in the subsequent reads to one or more sets of previous tag read criteria. When a threshold number of current tag read criteria are within threshold variations of the one or more sets of previous tag read criteria, the RFID evaluation control system can automatically remove the first RFID tag 114a as being detected by an RFID tag reader but should not be included in the association. In some embodiments, the RFID evaluation control system identifies a set of items associated with a customer based on an RFID tag read for each of the items of the set of items. For example, the set of items may be items intended to be purchased by the customer. Further, the RFID evaluation control circuit in the excluding the RFID tag can execute code to autonomously cause the identified item to be excluded by a point-of-sale system 120 from a purchase set of items to be purchased by the customer.

Still further, the RFID evaluation control system can identify when an RFID tag (and corresponding item) should be included in the association (e.g., included in a listing of products a subsequent customer is intending to purchase) based on the subsequent set of one or more tag read criteria not having the threshold number of tag read criteria being within the threshold variation of the previous one or more sets of tag read criteria. Some embodiments may further determine one or more adjusted sets of tag read criteria that are determined by statistical processing of multiple tag read criteria associated with a single RFID tag 114 (e.g., averaging one or more tag read criterion, determining standard deviation, determining a median, and/or other such statistical processing).

In some embodiments, the RFID evaluation control system 102 can further direct and/or cause one or more actions to be based on a detected RFID tag that has been erroneously included in an association (e.g., erroneously included in an association of items a customer intends to purchase, included in an association of products being stocked, included in an association of items being inventoried or counted, included in an association of items to be moved, and/or other such associations). The RFID evaluation control system, in some instances, can identify when an item is identified by a threshold number of persons as not to be included in the respective listings associated with the persons. For example, a threshold number of customers can each specify, upon being presented with a listing of items the point-of-sale system has determined the customer is purchasing, that the same first item 114a should not be included in the listing of items being purchased. The RFID evaluation control system can further cause an audit notification to be generated directing an audit of a product corresponding to the first item (e.g., an audit of packages of a particular type of gum proximate a point-of-sale system 120; an audit of 12-packs of diet Coca-Cola; etc.). In some embodiments, the RFID evaluation control system can communicate an audit request to a worker allocation and/or scheduling system associated with the shopping facility and/or part of the retail RFID tag exclusion system 100, which can issue instructions to one or more workers to perform the audit. The scheduling system can take into consideration worker workloads, previous tasks assigned, tasks scheduled to be performed, task priority information, and/or other such information. In other instances, the RFID evaluation control system is configured to communicate instructions to a worker directing the worker to perform the audit, which may take into consideration scheduled tasks, assigned tasks, task priority and/or other relevant information.

The RFID evaluation control system can further receive information about an audit of a product. In some instances, the RFID evaluation control system executes code to apply rules to identify, based on the audit performed at the retail shopping facility of one or more items of a product associated with an RFID tag that was previously identified as erroneously associated with one or more persons and/or other associations, that a first item exclusively associated with a set of previous tag read criteria is no longer present at the shopping facility. Based on the confirmation from the audit that the previous erroneous RFID tag is no longer present, the RFID evaluation control system can cause the set of tag read criteria associated with the erroneous item to be removed from the RFID criteria database or otherwise designated as no longer relevant. As such, the RFID evaluation control system can manage the RFID criteria database to reasonable levels and remove sets of tag read criteria that are no longer considered to be erroneously included in an association. Similarly, a set of tag read criteria may be removed from the RFID criteria database after threshold time of not detecting that set. In some embodiments, the RFID evaluation control system in applying one or more rules identifies that a threshold period of time has passed since a set of previous tag read criteria was detected relative to a limited area 202, and cause the set of tag read criteria to be removed from the RFID criteria database. Additionally, the RFID evaluation control system may remove a set of tag read criteria associated with a particular item based on an identification that the item associated with the set of tag read criteria was purchased by a customer. Further, in some instances, the RFID evaluation control system does not remove the set of tag read criteria upon identifying the item was purchased until after a threshold period of time following the purchase during which another set of tag read criteria was not detected that has a threshold number of the criteria within corresponding criteria thresholds or variations of the previous set of tag read criteria. Accordingly, the RFID evaluation control system can provide a self-healing of the RFID criteria database based on an audit and/or other actions taken to update the RFID criteria database and/or inventory system 116.

Again, the use of more than simply the identifier of an RFID tag allows the RFID evaluation control system to more accurately identify the same RFID tag is being read and erroneously associated with a customer, group of products, a worker, or the like. Further, the multiple tag read criteria allows the RFID evaluation control system to more accurately identify when that same RFID tag that was considered erroneous with some customers, or other association, should be included in a subsequent association and/or with a customer. For example, a product that was previously identified as erroneous based on a first set of tag read criteria will be detected different tag read criteria based, at least in part, on the movement of that RFID tag and the corresponding item. Accordingly, the RFID evaluation system can accurately identify an erroneous RFID tag and exclude the corresponding item, while accurately charging a subsequent customer that actually intends to purchase that item.

Figure 3:
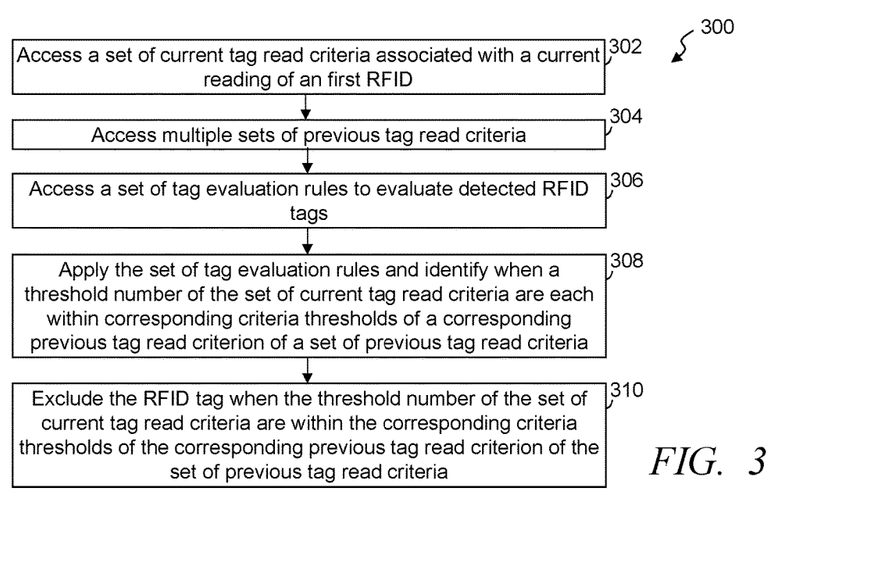
FIG. 3 illustrates a simplified flow diagram of an exemplary process of excluding erroneous RFID tags and their corresponding items, in accordance with some embodiments.

FIG. 3 illustrates a simplified flow diagram of an exemplary process 300 of excluding erroneous RFID tags, in accordance with some embodiments. In some implementations, many if not all of the steps of the process 300 are implemented by the RFID evaluation control system 102 while executing code of one or more computer program modules. In step 302, a first set of current tag read criteria associated with a current reading of a first RFID tag by a set of at least one RFID antennas is received. The tag read criteria may include one or more of RSSI, angle of reception, antenna identifier, rate, other such criteria, or a combination of two or more criteria corresponding to the detection and reading of RFID tags at a retail shopping facility.

In step 304, multiple sets of previous tag read criteria are accessed through one or more RFID criteria database 104. The computer memory storing the tag read criteria of the one or more RFID criteria databases may be part of the RFID evaluation control system 102, implemented at the retail shopping facility, and/or implemented through memory distributed over one or more computer memory systems communicatively coupled with the distributed network 112. Further, the RFID tag database may be implemented, in some embodiments, through one or more tabular organizational structures with RFID tag identifier information being associated with a series of corresponding tag read criteria entries associated with the RFID tag identifier. Additionally or alternatively, the tag read criteria may be associated based on an RFID antenna and/or RFID tag reader that acquired the tag read criteria.

In step 306, a set of at least one tag evaluation rules to evaluate detected RFID tags is accessed. Some embodiments maintain one or more evaluation rules databases that are pare of and/or accessible (e.g., via the distributed computer network 112) by the RFID evaluation control system. The rules may be generated based on historic evaluations of tag read criteria over time corresponding to limited areas 202 and/or based on sequential events (e.g., sequential check-outs by customers, sequential stocking of one or more shelves within the limited area, etc.). For example, historic evaluations can be performed to identify when a single item has been sequentially included in two or more customers' check-outs, and rules identified based on variations in tag read criteria detected in those sequential detections. As another example, multiple tests can be performed with known items in known locations to provide repeated items that are detected via their RFID tags. The sets of tag read criteria for each sequential read of the plurality of known items can be evaluated to identify variations and/or lack of variations in the RFID tag reads that used to define rules and thresholds for subsequent evaluations. As additional RFID tag reads are performed and additional corresponding tag read criteria are accumulated, based in part on the known items, the rules can be refined and/or confirmed. The rules can dictate priorities of tag read criteria, groupings of tag read criteria, how tag read criteria are to be evaluated (e.g., difference of a current tag read criterion relative to an average of multiple previous reads of the tag read criterion, an average difference of a current tag read criterion relative to multiple previous reads of the tag read criterion, whether a weighting is applied, limits, thresholds over variation, threshold numbers of tag read criteria, etc.).

In step 308, the set of tag evaluation rules are applied to identify when a threshold number of the set of current tag read criteria are each within corresponding criteria thresholds of a corresponding previous tag read criterion of a set of previous tag read criteria. The threshold may be defined by the rules and/or a threshold database. The thresholds may be determined based on testing, and adjusted over time based on feedback from customers, audits and other such information. In step 310, an RFID tag is excluded when the threshold number of the set of current tag read criteria are within the corresponding criteria thresholds of the corresponding previous tag read criterion of the set of previous tag read criteria.

Some embodiments identify a first set of items associated with a person (e.g., items that a customer is purchasing, items a worker is stocking, etc.). A listing of items comprising the first set of items is caused to be presented to the person. For example, a listing can be displayed on a customer display in close proximate to a point-of-sale system and/or on a display of a point-of-sale system, on a personal computing device 118 of a customer, worker or the like, or otherwise presented to the person. As a further example, in some instances a point-of-sale system 120 is caused to render the listing through a graphical user interface displayed on a display associated with the point-of-sale system and/or in communication with the RFID evaluation control system. The point-of-sale system may generate the listing based on items the point-of-sale system identifies as being purchased, the RFID evaluation control system may direct the display of the listing through the point-of-sale system, the customer computing device, a display system secured with a shopping cart being used by the customer, or other relevant display system. In some embodiments, the person may identify an item that should not be included in the listing. As such, a notification may be received that specifies by the person that a first item should not be included in the listing. This notification can be from a selection by the person on the user interface of the listed first item in the listing, a text from the person's computing device, or other such notification. A corresponding set of tag read criteria associated with the first item can be caused to be added to the RFID criteria database.

The RFID evaluation control system may trigger an audit event of one or more items and/or products. Some embodiments identify when the first item is identified by a threshold number of persons as not to be included in the respective listings associated with the persons, and causes an audit notification to be generated directing an audit of a first product corresponding to the first item. The audit notification may be directed to a worker (e.g., on a worker's computing device, a scanner device, etc.), communicated to a work scheduling system of the retail facility, and/or other such initiations. In some embodiments, the RFID evaluation control system executes code to identify when a threshold number of a set of previous tag read criteria have each been within corresponding criteria thresholds of a threshold number of other sets of tag read criteria, and can cause the set of previous tag read criteria to be designated as an erroneous set of tag reads to be used to exclude subsequent sets of tag read criteria that have the threshold number of tag read criteria that each are within the corresponding criteria thresholds of the set of previous tag reads.

Further, in some embodiments, a set of items associated with a first customer can be identified based on an RFID tag read for each of the items of the set of items, including an RFID tag being evaluated, and intended to be purchased by the first customer. The RFID evaluation control system can autonomously cause a first item to be excluded by a point-of-sale system from a purchase set of items to be purchased by the first customer. Some embodiments identify, based on an audit performed at the retail shopping facility of items of a product associated with a first RFID tag, that a first item exclusively associated with a third set of previous tag read criteria is no longer present at the shopping facility, and cause the third set of tag read criteria associated with the first item to be removed from the RFID criteria database. In some instances, some embodiments identify that a threshold period of time has passed since a set of previous tag read criteria was detected relative to a limited area, and causes the set of previous tag read criteria to be removed from the RFID criteria database. Further, some embodiments do not consider the RFID tag identifier as a criterion, and in such implementations the set of current tag read criteria does not include an identifier of the RFID tag.

Figure 4:
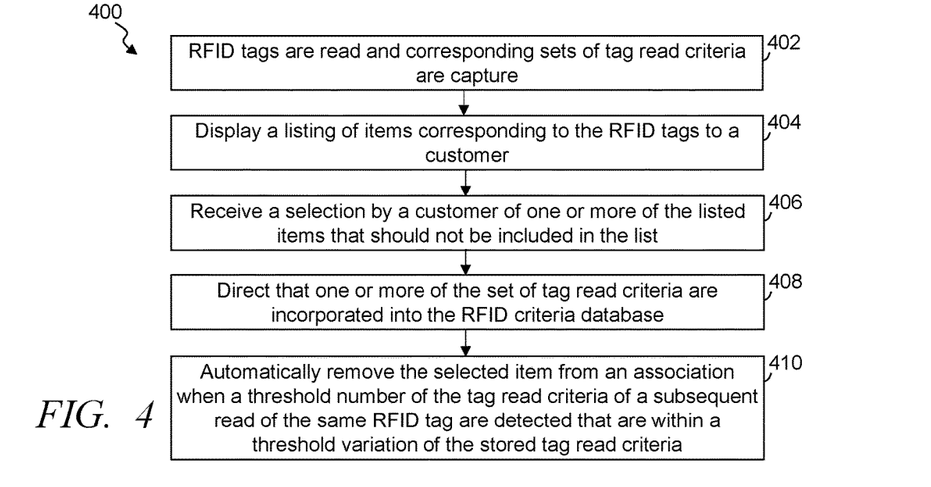
FIG. 4 illustrates a simplified flow diagram of an exemplary process of identifying and excluding erroneous RFID tags from one or more associations, in accordance with some embodiments.

FIG. 4 illustrates a simplified flow diagram of an exemplary process 400 of identifying and excluding erroneous RFID tags and/or their corresponding items from one or more associations, in accordance with some embodiments. The process 400 may be used in cooperation with the process 300. In other instances, some or all of the steps of the process 400 are implemented as part of the process 300. In step 402, a one or more RFID tags are read by a set of one or more RFID tag readers 108 and/or antennas 110, and a corresponding set of tag read criteria are capture (e.g., arrival angle, frequency, antenna, RSSI, read rate, etc.) for each RFID tag. In step 404, a listing of items corresponding to the RFID tags is displayed to a customer, worker or other person with which an association of items is relevant. In step 406, a selection by the customer (or other person) is received of one or more of the listed items that should not be included in the list. In step 408, the RFID evaluation control system can direct that one or more of the set of tag read criteria corresponding the item identified by the customer are incorporated into the RFID criteria database 104. In step 410, the RFID evaluation control system automatically causes the selected item to be removed from an association of items, association with a customer or other association when a threshold number of the tag read criteria of a subsequent read of the same RFID tag are detected that are within a threshold variation of the stored tag read criteria.

The shopping facility may, in some instances, be a retail sales facility, a fulfillment center, a distribution center, or other type of facility. Some shopping facilities position numerous products throughout a sales floor that are to be sold in which products are sold and/or distributed to customers. The facility may be any size or format, and may include products from one or more merchants. For example, a facility may be a single store operated by one merchant, a chain of two or more stores operated by one entity, or may be a collection of stores covering multiple merchants.

Figure 5:
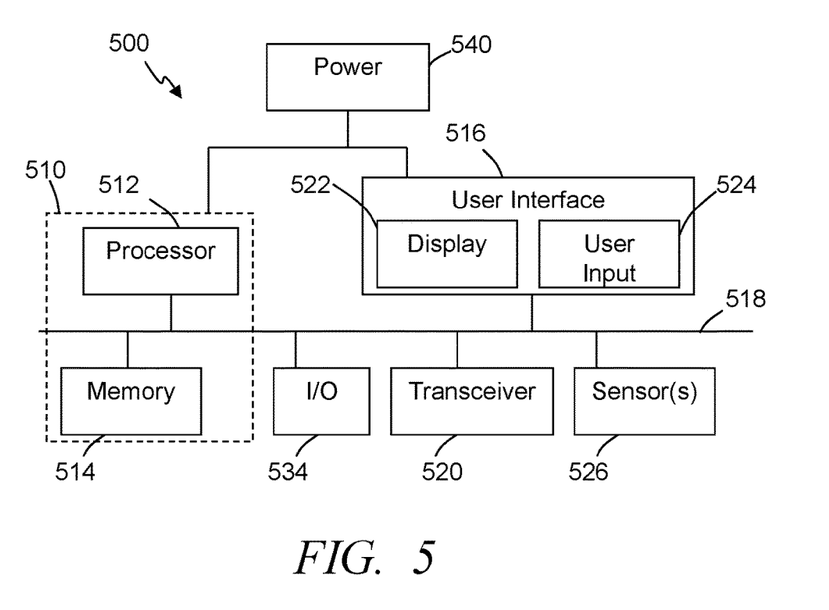
FIG. 5 illustrates an exemplary system for use in implementing methods, techniques, devices, apparatuses, systems, servers, sources and improving RFID tag reads and excluding erroneously associated RFID tags.

Further, the circuits, circuitry, systems, devices, processes, methods, techniques, functionality, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the RFID tag exclusion system 100, the retail facility, or other facility associated with a retail facility (e.g., a central facility in communication with components of multiple retail facilities), and/or other above or below mentioned systems, components, or devices, or parts of such circuits, circuitry, functionality, systems, apparatuses, processes, or devices. For example, the system 500 may be used to implement some or all of the RFID evaluation control system 102, the RFID tag reader 108, the inventory system 116, customer computing devices 118, the point-of-sale systems 120, customer profile systems, product profile systems, and/or other such components, circuitry, functionality and/or devices. However, the use of the system 500 or any portion thereof is certainly not required.

By way of example, the system 500 may comprise a control circuit or processor module 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, software modules, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is executed by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like. For example, the system may implement the RFID evaluation control system with the control circuit being an RFID evaluation control circuit, an RFID tag reader 108 with the control circuit being an RFID tag reader control circuit, the inventory system 116 with an inventory system control circuit, a customer computing device 118 with the control circuit being a computing system control circuit, a point-of-sale system 120 with the control circuit being a POS control circuit, or other components.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network 112 (e.g., a local area network (LAN), the Internet, wide area network (WAN), etc.), communication link 518, other networks or communication channels with other devices and/or other such communications or combination of two or more of such communication methods. Further the transceiver 520 can be configured for wired, wireless, optical, fiber optical cable, satellite, or other such communication configurations or combinations of two or more of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports. The I/O interface 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor readable and/or computer readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 112. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

In some embodiments, systems, apparatuses and corresponding methods performed by the systems and apparatuses improve RFID tag reading. Some embodiments provide retail RFID tag exclusion systems that comprise: a set of at least one RFID antennas positioned proximate a limited area within a retail shopping facility and configured to detect RFID tags within the area; an RFID criteria database receiving and storing sets of RFID tag read criteria; an RFID evaluation control circuit implementing code stored on memory and configured to: access a first set of current tag read criteria associated with a current reading of a first RFID tag by the set of at least one RFID antennas; access, through the RFID criteria database, multiple sets of previous tag read criteria; access a set of at least one tag evaluation rules to evaluate detected RFID tags; apply the set of tag evaluation rules and identify when a threshold number of the first set of current tag read criteria are each within corresponding criteria thresholds of a corresponding previous tag read criterion of a second set of previous tag read criteria; and exclude the first RFID tag when the threshold number of the first set of current tag read criteria are within the corresponding criteria thresholds of the corresponding previous tag read criterion of the second set of previous tag read criteria.

Further, some embodiments provide methods of excluding erroneous retail RFID tags, comprising: accessing a first set of current tag read criteria associated with a current reading of a first RFID tag by a set of at least one RFID antennas; accessing, through an RFID criteria database, multiple sets of previous tag read criteria; accessing a set of at least one tag evaluation rules to evaluate detected RFID tags; applying the set of tag evaluation rules and identifying when a threshold number of the first set of current tag read criteria are each within corresponding criteria thresholds of a corresponding previous tag read criterion of a second set of previous tag read criteria; and excluding the first RFID tag when the threshold number of the first set of current tag read criteria are within the corresponding criteria thresholds of the corresponding previous tag read criterion of the second set of previous tag read criteria.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail RFID tag exclusion system, comprising:
a set of at least one RFID tag readers positioned proximate a limited area and configured to detect RFID tags within the limited area; and
an RFID evaluation control circuit configured to:
 access a current first set of one or more current tag read criteria associated with a current reading of a first RFID tag by at least one of the set of at least one RFID tag readers;
 access multiple sets of previous tag read criteria previously detected by one or more of the set of at least one RFID tag readers;
 access a set of at least one tag evaluation rules to evaluate detected RFID tags;
 apply one or more tag evaluation rules of the set of at least one tag evaluation rules and identify when a threshold number of the first set of one or more current tag read criteria are each within a corresponding criteria threshold of a corresponding previous tag read criterion of a second set of one or more previous tag read criteria; and
 exclude the first RFID tag when the threshold number of the first set of one or more current tag read criteria are within the corresponding criteria threshold of the corresponding previous tag read criterion of the second set of one or more previous tag read criteria.

2. The system of claim 1, wherein the RFID evaluation control circuit is configured to:
 identify a first set of items associated with a first person;
 cause a listing of items comprising the first set of items to be presented to the first person;
 receive a notification specified by the first person that a first item should not be included in the listing; and
 cause a corresponding third set of tag read criteria associated with the first item to be added to an RFID criteria database that receives and stores sets of previously detected RFID tag read criteria, wherein each set of the previously detected RFID tag read criteria corresponds to a single RFID tag, including the second set of one or more previous tag read criteria.

3. The system of claim 2, wherein the RFID evaluation control circuit in causing the listing of items to be presented to the first person is configured to cause a point-of-sale system to render the listing through a graphical user interface displayed on a display associated with the point-of-sale system.

4. The system of claim 2, wherein the RFID evaluation control circuit is configured to identify when the first item is identified by a threshold number of persons as not to be included in the respective listings associated with the persons, and cause an audit notification to be generated directing an audit of a first product corresponding to the first item.

5. The system of claim 1, wherein the RFID evaluation control circuit is configured to:
 identify when a threshold number of a third set of previous tag read criteria have each been within corresponding criteria thresholds of a threshold number of other sets of tag read criteria; and
 designate the third set of previous tag read criteria as an erroneous set of tag reads to be used to exclude subsequent sets of tag read criteria that have the threshold number of tag read criteria that each are within the corresponding criteria thresholds of the third set of previous tag reads.

6. The system of claim 1, wherein the RFID evaluation control circuit is configured to:
 identify a first set of items associated with a first customer based on an RFID tag read for each of the items of the first set of items, including the first RFID tag, and intended to be purchased by the first customer;
 wherein the RFID evaluation control circuit in excluding the first RFID tag is configured to autonomously cause the first item to be excluded by a point-of-sale system from a purchase set of items to be purchased by the first customer.

7. The system of claim 1, wherein the RFID evaluation control circuit is configured to:
 identify, based on an audit performed at a retail shopping facility of items of a product associated with the first RFID tag, that a first item exclusively associated with a third set of previous tag read criteria is no longer present at the shopping facility; and
 cause the third set of previous tag read criteria associated with the first item to be removed from an RFID criteria database storing sets of previously detected RFID tag read criteria.

8. The system of claim 1, wherein the RFID evaluation control circuit is configured to:
 identify that a threshold period of time has passed since a third set of previous tag read criteria was detected relative to the limited area; and
 cause the third set of previous tag read criteria to be removed from an RFID criteria database storing sets of previously detected RFID tag read criteria.

9. The system of claim 1, wherein the RFID evaluation control circuit in excluding the first RFID tag is configured to cause a first product corresponding to the first RFID tag to be excluded from a listing of products associated with a customer.

10. The system of claim 1, wherein the first set of one or more current tag read criteria comprises one or more of signal strength indicator (RSSI), angle of signal arrival, phase of modulation, read rate, identification of an antenna detecting a single from the first RFID tag, and an identifier within data received from the first RFID tag.

11. A method of excluding erroneous retail RFID tags, comprising:
 accessing a first set of one or more current tag read criteria associated with a current reading of a first RFID tag by a set of at least one RFID tag reader;
 accessing multiple sets of previous tag read criteria previously detected by one or more of the set of at least one RFID tag readers;
 accessing a set of at least one tag evaluation rules to evaluate detected RFID tags;
 applying one or more tag evaluation rules of the set of tag evaluation rules and identifying when a threshold number of the first set of one or more current tag read criteria are each within a corresponding criteria threshold of a corresponding previous tag read criterion of a second set of one or more previous tag read criteria; and
 excluding the first RFID tag when the threshold number of the first set of one or more current tag read criteria are within the corresponding criteria thresholds of the corresponding previous tag read criterion of the second set of one or more previous tag read criteria.

12. The method of claim 11, further comprising:
 identifying a first set of items associated with a first person;
 causing a listing of items comprising the first set of items to be presented to the first person;
 receiving a notification specified by the first person that a first item should not be included in the listing; and causing a corresponding third set of tag read criteria associated with the first item to be added to an RFID criteria database that receives and stores sets of previously detected RFID tag read criteria, wherein each set of the previously detected RFID tag read criteria corresponds to a single RFID tag, including the second set of one or more previous tag read criteria.

13. The method of claim 12, wherein the causing the listing of items to be presented to the first person comprises causing a point-of-sale system to render the listing through a graphical user interface displayed on a display associated with the point-of-sale system.

14. The method of claim 12, further comprising:
identifying when the first item is identified by a threshold number of persons as not to be included in the respective listings associated with the persons; and
causing an audit notification to be generated directing an audit of a first product corresponding to the first item.

15. The method of claim 11, further comprising:
identifying when a threshold number of a third set of previous tag read criteria have each been within corresponding criteria thresholds of a threshold number of other sets of tag read criteria; and
designating the third set of previous tag read criteria as an erroneous set of tag reads to be used to exclude subsequent sets of tag read criteria that have the threshold number of tag read criteria that each are within the corresponding criteria thresholds of the third set of previous tag reads.

16. The method of claim 11, further comprising:
identifying a first set of items associated with a first customer based on an RFID tag read for each of the items of the first set of items, including the first RFID tag, and intended to be purchased by the first customer; wherein the excluding the first RFID tag comprises autonomously causing the first item to be excluded by a point-of-sale system from a purchase set of items to be purchased by the first customer.

17. The method of claim 11, further comprising:
identifying, based on an audit performed at a retail shopping facility of items of a product associated with the first RFID tag, that a first item exclusively associated with a third set of previous tag read criteria is no longer present at the shopping facility; and
causing the third set of previous tag read criteria associated with the first item to be removed from an RFID criteria database storing sets of previously detected RFID tag read criteria.

18. The method of claim 11, further comprising:
identifying that a threshold period of time has passed since a third set of previous tag read criteria was detected relative to an area; and
causing the third set of previous tag read criteria to be removed from an RFID criteria database storing sets of previously detected RFID tag read criteria.

19. The method of claim 11, wherein the excluding the first RFID tag comprises causing a first product corresponding to the first RFID tag to be excluded from a listing of products associated with a customer.

20. The method of claim 11, wherein the first set of one or more current tag read criteria comprises one or more of signal strength indicator (RSSI), angle of signal arrival, phase of modulation, read rate, identification of an antenna detecting a single from the first RFID tag, and an identifier within data received from the first RFID tag.

* * * * *

UNITED STATES PATENT AND TRADEMARK OFFICE
CERTIFICATE OF CORRECTION

PATENT NO. : 10,467,443 B2
APPLICATION NO. : 16/397889
DATED : November 5, 2019
INVENTOR(S) : Nicholaus A. Jones et al.

It is certified that error appears in the above-identified patent and that said Letters Patent is hereby corrected as shown below:

In the Claims

Column 16, Line 36, Claim 10, insert the word --received-- prior to the phrase "signal strength indicator (RSSI)".

Column 16, Line 38, Claim 10, delete the word "single" and insert --signal-- prior to the word "from".

Column 18, Line 28, Claim 10, insert the word --received-- prior to the phrase "signal strength indicator (RSSI)".

Column 18, Line 30, Claim 20, delete the word "single" and insert --signal-- prior to the word "from".

Signed and Sealed this
Thirty-first Day of December, 2019

Andrei Iancu
*Director of the United States Patent and Trademark Office*